United States Patent

Bauer et al.

[11] Patent Number: 6,053,575
[45] Date of Patent: Apr. 25, 2000

[54] MOTOR VEHICLE SEAT WITH A BACK REST AND A BUCKET SEAT

[76] Inventors: Heinz Bauer, Hammerstr. 9, D-42699; Burckhard Becker, Obenkatternberg 25, D-42655; Ernst-Reiner Frohnhaus, Hammerstr. 13, D-42699, all of Solingen, Germany

[21] Appl. No.: 09/138,414

[22] Filed: Aug. 24, 1998

[30] Foreign Application Priority Data

Sep. 17, 1997 [DE] Germany .............. 197 40 045

[51] Int. Cl.⁷ .............. A47C 1/023; B60N 2/02
[52] U.S. Cl. .............................. 297/337; 297/318
[58] Field of Search .................. 297/337, 317, 297/318, 344.15; 248/160, 424

[56] References Cited

U.S. PATENT DOCUMENTS

| | | | |
|---|---|---|---|
| 4,648,654 | 3/1987 | Voss | 297/344.15 X |
| 4,787,674 | 11/1988 | Inaba et al. | 297/317 |
| 4,966,411 | 10/1990 | Katagiri et al. | 297/317 X |
| 5,261,724 | 11/1993 | Meiller et al. | 297/344.15 |
| 5,613,662 | 3/1997 | Blackmore | 297/344.158 |
| 5,622,406 | 4/1997 | Meschkat et al. | 297/318 |

*Primary Examiner*—Peter R. Brown
*Attorney, Agent, or Firm*—John Lezdey & Associates

[57] ABSTRACT

The invention relates to a motor vehicle seat with an underframe, onto which a back rest is linked in a swiveling manner on one hand and which carries on the other hand a bucket seat, which is embodied in a plane manner, and which is connected to the underframe on one hand in its front area via a swiveling axis running crosswise and which is connected on the other hand in its back area via elastic, which effect a spring suspension of the bucket seat around the swiveling axis. For adjusting the seat depth of the motor vehicle seat i) the swiveling axis is kept in the longitudinal guide in an adjustable manner, the course thereof is essentially parallel to the level of the bucket seat and crosswise to the swiveling axis, whereby an adjustment device for the fixation of the swiveling axis is provided in the longitudinal guide and ii) the elastic is attached to the bucket seat as well as to the underframe of the carriage in a flexible manner.

7 Claims, 1 Drawing Sheet

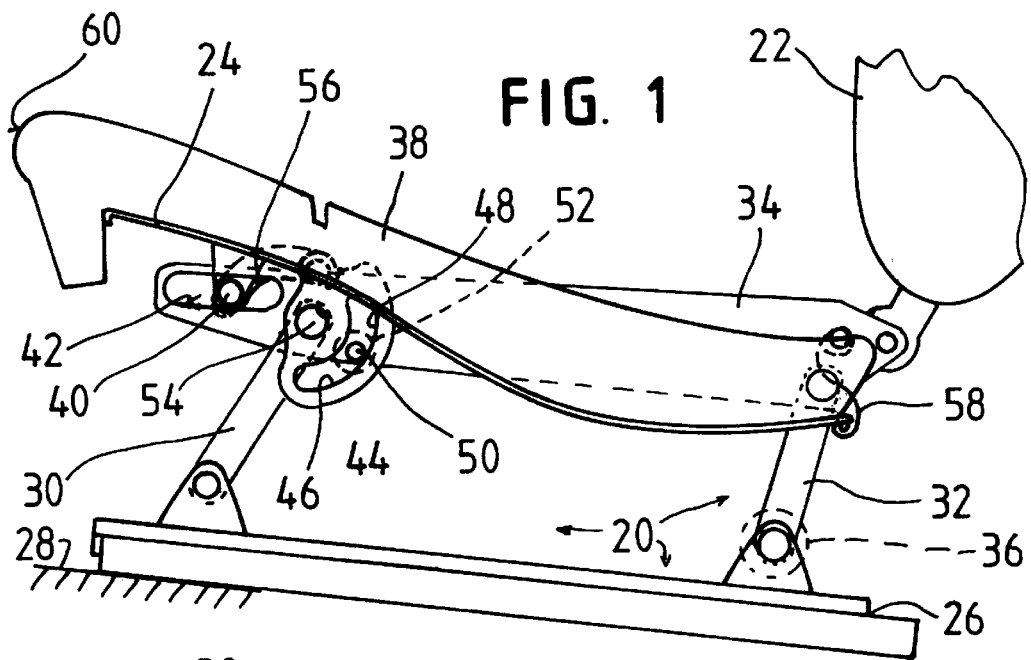
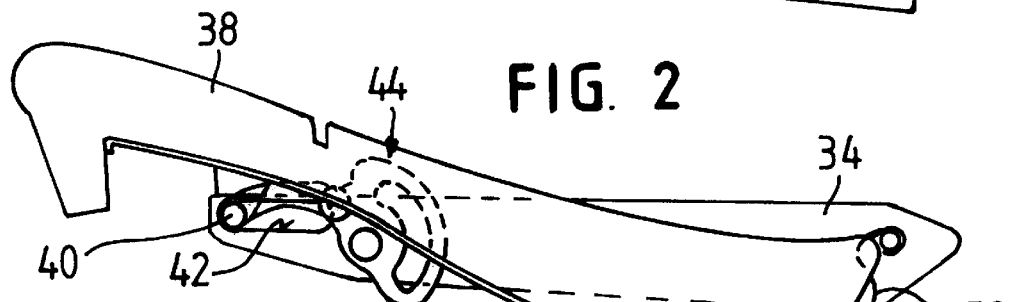
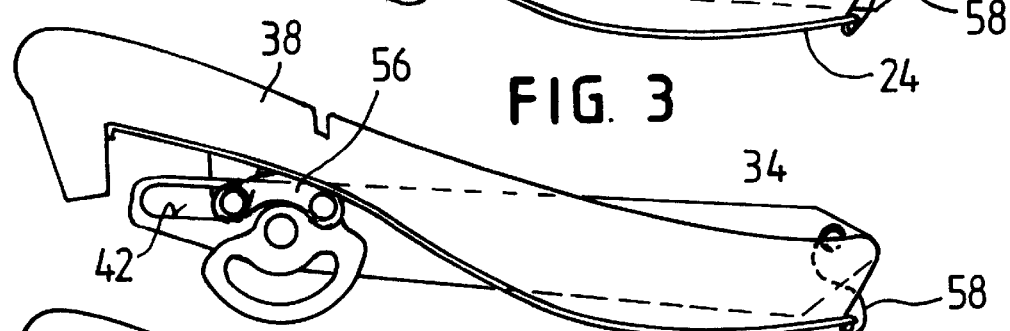
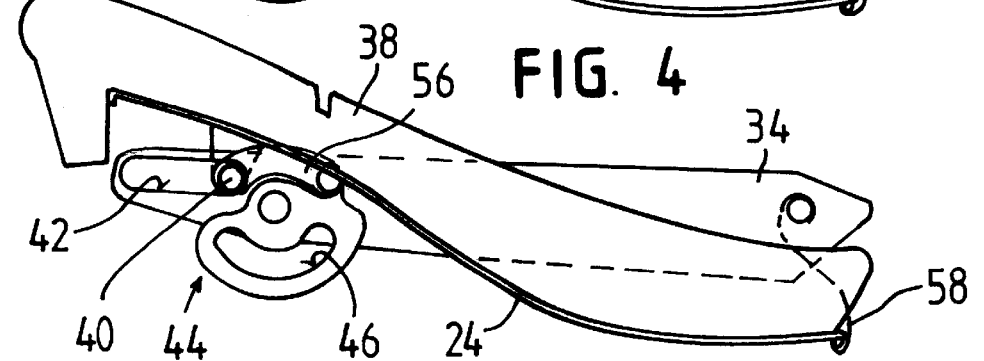

MOTOR VEHICLE SEAT WITH A BACK REST AND A BUCKET SEAT

FIELD OF THE INVENTION

The invention relates to a motor vehicle seat with an underframe, onto which a back rest is linked in a swiveling manner on one hand and which on the other hand carries a bucket seat, which is embodied in a plane manner, and which is connected on one hand in its front area via a swiveling axis running crosswise and which is connected on the other hand in its back area via elastic means, which effect a spring suspension of the bucket seat around the swiveling axis.

BACKGROUND OF THE INVENTION

With the motor vehicle seat of this kind already known from the DE 195 23 138 A1 a change of the seat depth of the motor vehicle seat is not provided. For a better comfort, but also for better ergonomical conditions at a motor vehicle seat, it is an advantage to have an adjustment of the seat depth of the actual seat area of a motor vehicle seat. According to this, the invention plans in this particular direction.

With the motor vehicle seat already known the seat bucket is embodied by an essentially plane sheet metal part to which a frame, which surrounds the same is allocated. In the back area the seat bucket is connected with the frame via draw springs, in the front area it is allocated to the frame via a swiveling axis running crosswise, which is embodied as a film hinge. An adjustment of the bucket seat with regard to the frame is not possible with this construction, for an adjustment of the seat depth the entire frame with the bucket seat is supposed to be made adjustable. This is very cost effective however. The frame normally carries fairly thin upholstery with the motor vehicle already known with the bucket seats in question. With the bucket seats the comfort of the compliance of the spring of the seat area is achieved not by the actual upholstery body, but by the spring suspension of the bucket seat with regard to the underframe of the carriage.

OBJECTS AND SUMMARY OF THE INVENTION

Departing from the motor vehicle seat of the above mentioned kind, it is the task of the invention to further develop a motor vehicle seat in such a way that an adjustment of the seat depth is achieved by simple means. The term seat depth is hereby defined by an alteration of the front edge of a seat area in one direction, which on one hand is placed on the level of the seat area and on the other hand crosswise to the back rest in the normal position thereof.

Departing from the motor vehicle seat of the above mentioned kind, this task is solved in such a way that for adjusting the seat depth of the motor vehicle seat i) the swiveling axis is kept in the longitudinal guide in an adjustable manner, the course thereof is essentially parallel to the level of the bucket seat and crosswise to the swiveling axis, whereby an adjustment device for the fixation of the swiveling axis is provided in the longitudinal guide and ii) the elastic means are attached to the bucket seat as well as to the underframe of the carriage in a flexible manner.

According to the invention the swiveling axis is kept in a longitudinal guide. Thereby its position is dictated on a linear path, preferably the area of motion is a (straight) line. The position within this area of motion is fixed by an adjustment device at any position whatever or at least closely graduated in small steps.

The elastic means are attached in a flexible manner to the bucket seat as well as to the underframe of the carriage. Due to that they take a different angular position depending on the adjustment position of the bucket seat with regard to the underframe of the carriage. Based on the flexible arrangement they are able to receive and adjust the different positions of the bucket seat, here the back area, with regard to the underframe of the carriage. They are preferably arranged in such a way that their direction of the spring runs crosswise to the direction of adjustment of the bucket seat with regard to the underframe of the carriage. Preferably they are therefore arranged crosswise to the level of the bucket seat. In a relative position between the bucket seat and the underframe of the carriage they run in a rectangular way to the level of the bucket seat. This relative position is preferably achieved in the medium area of the entire adjustment path of the bucket seats.

It has proven to be especially advantageous, to embody the elastic means via at least one leaf spring, which is bent in an S-shape manner. It stretches when rebounding and at the same time effects a limitation of the maximum spring path. Independently from this fact, also other limitations of the maximum spring path of the elastic means can be provided, for example mountings. Preferably a spring is provided on each side of the bucket seat.

The longitudinal guide and the corresponding adjustment device can be embodied in any shape whatever. It has proven to be advantageous to embody the longitudinal guide as a gate type guide and to make sure that the position of the swiveling axis within the guides of the gate types can be fixed via a suitable adjustment device. It is also advantageous for the embodiment of the longitudinal guide to have a side swiveling support each, which runs essentially crosswise to the level of the bucket seat and therefore dictates a bow-like adjustment path. A suitable adjustment device as known from the state of the art is allocated to the swiveling support.

As already known the components of the kind of motor vehicle seat in question on the left side and on the right side of the swiveling shell (seen from the position of the user of the seat) are of the same construction but asymmetrical. The adjustment device, which has a drive, for example a hand wheel or an adjusting motor, is also provided on both sides, but only one drive is embodied. The same is placed—in the shape of a hand wheel or—lever—at one side of a the seat.

Further advantages and characteristics of the invention derive from the other claims as well as the following description of a non-restrictive embodiment of the invention, which is illustrated further with regard to the drawing. This drawing shows in:

BRIEF DESCRIPTION OF THE DRAWINGS

FIG. 1: a side view of a motor vehicle seat, which is connected to the understructure of the body, FIG. 2: a side view in the shape of a cutting of FIG. 1, which essentially illustrates a seat carrier and a bucket seat, here however in another adjusting position, FIG. 3: an illustration according to FIG. 2 with the bucket seat in the backward position, the bucket seat is not deflected and FIG. 4: an illustration according to FIG. 3, this time with the deflected bucket seat.

DESCRIPTION OF THE PREFERRED EMBODIMENTS

The motor vehicle seat has an underframe of the carriage 20, onto which on one hand a back rest 22 is coupled in a swiveling manner and which carries a bucket seat 24 on the other hand. The actual seat area of the motor vehicle seat is embodied according to this as a bucket seat.

The underframe of the carriage 20 is arbitrary in its construction, in the illustrated embodiment, it is embodied via a longitudinal guiding device 26, which consists of two already known parallel pair of carriers, which are arranged sideways, namely a bottom carrier and a seat carrier. The bottom carriers are rigidly connected to a part of the motor vehicle, here with the understructure of the body 28. Two parallelogram arms 30, 32, which are again coupled to a seat carrier 34 at their upper ends, are coupled to a seat support 34. That way a four-bar linkage is embodied. An adjustment device is provided, for example the adjustment device 36 of a known construction but not relevant for this purpose to be able to adjust and arrange the underframe 20, which is exactly described. This is already known, the reference to the EP 0 445 528 B1 is to be seen as an example.

The seat support 34 carries the bucket seat. The latter is essentially embodied in a two-dimensional manner, it carries a relatively thin upholstery body 38. The bucket seat 24 has a swiveling axis 40 running crosswise, in its front area. The same is controlled in a longitudinal guide 42 of the seat support 34, which is embodied as a longitudinal slot. The adjustment movement essentially extends parallel to the level, which is stretched by the seat support 24, it essentially extends parallel to the level, which is embodied by the bucket seat 24.

An adjustment device 44 is provided for the fixation of the position of the swiveling axis 40 within the longitudinal guide 42. This will be explained in the following. A tooth segment 46 is linked at the seat support 34 in a swiveling manner, the gear tooth forming, which is not explained in detail at this point, is positioned on the segment 48. A pinion 50 is allocated to it, which can be turned by a drive in a manner already known, which is embodied here as a hand wheel 52. A blocking device which is also already known is allocated to the drive. This blocking device keeps the pinion 50 in its respective turning position, when the drive is not being operated.

The tooth segment 46 is linked around an axis 54 to the seat support 54. Preferably the same is developed as the traverse, which realizes the two sides of the seat, whereby the two side tooth segments 46 receive in the same angular position towards the seat carrier 34.

In a distance to this axis 54 an adjusting arm 56, which acts upon the swiveling axis 40 with its other end, is linked at the tooth segment 46. That way, the different angular position of the tooth segment 46 is turned into a linear movement, namely the adjustment of the swiveling axis 40 within its longitudinal guide 42.

As already pointed out, the already described means of adjustment are positioned on both sides of the seat. The drive is only provided once each time and is transferred from one side of the seat to the other, for example by using the already described traverse.

Other embodiments are also possible of the longitudinal guide 42 and/or of the adjustment device 44 allocated to it. For example, the swiveling axis 40 may be connected to the seat support 34 via swiveling supports, which are embodied in a similar way to the already described adjustment arms and which are allocated to the swiveling axis 40, but which in contrast to the same stand essentially crosswise to the level of the bucket seat 24. A wobble plate mechanism can be used as an adjustment device for example.

In the back area, the bucket seat 24 is connected to the seat support 34 via elastic means 58. In the actual case two side springs are provided, which are embodied as leaf springs, which are bent in an s-shape manner. They might also be embodied as common draw-coil springs, which does not exclude other possible embodiments. In the actual embodiment the springs are bent at their final areas as a loop. These loops receive the axis, which project from the seat support 34 or the bucket seat 24. That way, a joint connection is achieved at both ends of the springs between the spring and the bucket seat 24 or the seat support 34 respectively.

When adjusting the seat depth the angular position changes, which the spring 58 embodies towards a point of reference, for example towards the seat support 34. FIG. 1 illustrates a central position of the adjustment of the seat depth. Departing from the entire adjustment path of 50 mm, the bucket seat 24 is adjusted 25 mm to the front (with reference to the most backward position) compared to the seat support 34. In the position according to FIG. 1, the bucket seat is not illustrated with spring deflection, the springs 58 are in their resting position. The two hinge points of the springs are essentially upright above other. Their connecting line runs crosswise to the level, which is stretched by the bucket seat 24.

In the embodiment according to FIG. 2 the bucket seat 24 is in its most forward position, the springs are also not with spring deflection. On can see here that the two hinge points of each spring do not stand upright above each other, but rather that the lower hinge point is shifted more to the left to a front edge of the seat 60.

In the FIGS. 3 and 4 to be discussed at a later stage, the bucket seat 24 is in its most backward position with regard to the seat support 34. FIG. 3 illustrates a state without spring deflected elastic means 58, FIG. 4 illustrates the same state, but with spring deflection with a spring path of about 20 mm.

Again one can see that the two hinge points o the spring 58 are not above each other in a vertical way, but rather that the lower hinge point is shifted more to the right with regard to a vertical line through the upper hinge point.

As can be seen in a comparison of FIGS. 3 and 4 the spring 58 stretches further when stressed. It changes from its essentially s-shape state into a nearly stretched, but still slightly s-shape state. By this it effects a stroke arrest at the same time.

In addition to the illustrated embodiment it is possible to provide an arm 62 at the adjustment arm or at the swiveling axis 40, which is connected to it with torsional strength. This arm is directly or indirectly allocated to the front edge of the seat 60 and with its free end changes the position of the front edge of the seat 60 slightly, for example by only a few centimeters. That way the front edge of the seat 60 is moved progressively in a relative manner to the front departing from it shortest distance to the backward area of the bucket seat 24, as this is illustrated in FIGS. 3 and 4, when shifting forward the bucket seat 24 compared to the seat support 34 and via the position according to FIG. 1 into the position according to FIG. 2.

What is claimed is:

1. In a motor vehicle seat comprising in combination a) an underframe, b) a backrest and c) a bucket seat having a spring suspension; said backrest being linked to said underframe, so that said backrest can be swivelled relative to said underframe; said bucket seat having a front area and a back area, said front area being connected to said seat carrier of said underframe via a swivelling axis, said back area being connected via elastic means to said underframe, said elastic means effecting said spring suspension of said bucket seat around said swivelling axis, the improvement which comprises said seat carrier having a longitudinal guide, said swivelling axis being guided in said longitudinal guide, including an adjustment device for a fixation of said swivelling axis in said longitudinal guide so that a selected position of said swivelling axis in said longitudinal guide can be adjusted and fixed, said longitudinal guide extending essentially parallel to a plane defined by said bucket seat, said longitudinal guide further extending orthogonal to said swivelling axis, and said elastic means being coupled to said bucket seat, said elastic means further being coupled, to said underframe, so that the portion of said elastic means varies depending on said selected position of said swivelling axis with regard to said underframe.

2. The motor vehicle seat according to claim 1 wherein said longitudinal guide is a slot.

3. The motor vehicle seat according to claim 1 wherein said adjustment device comprises a) a tooth segment which is linked to said bucket seat, b) a pinion allocated to said tooth segment and c) a hinge are, which connects said swivelling axis to said tooth segment in a flexible manner.

4. The motor vehicle seat according to claim 1 wherein said underframe comprises a seat support, said longitudinal guide is located in said seat support.

5. The motor vehicle seat according to claim 1 wherein said elastic means comprise at least one leaf spring, which is bent in an s-shaped manner without spring deflection.

6. The motor vehicle seat according to claim 5 wherein said at least one leaf spring has loops at its end for receiving an articulated axle.

7. The motor vehicle seat according to claim 1 wherein said elastic means comprise a stop, which limits their maximum elongation.

* * * * *